(12) United States Patent
Schmidt et al.

(10) Patent No.: US 8,924,509 B2
(45) Date of Patent: Dec. 30, 2014

(54) AUTOMATED SERVICE DISCOVERY AND DYNAMIC CONNECTION MANAGEMENT

(75) Inventors: Brian K. Schmidt, Sunnyvale, CA (US); James G. Hanko, Redwood City, CA (US); J. Duane Northcutt, Menlo Park, CA (US)

(73) Assignee: Silicon Image, Inc., Sunnyvale, CA (US)

( * ) Notice: Subject to any disclaimer, the term of this patent is extended or adjusted under 35 U.S.C. 154(b) by 0 days.

(21) Appl. No.: 13/541,390

(22) Filed: Jul. 3, 2012

(65) Prior Publication Data

US 2012/0296955 A1    Nov. 22, 2012

Related U.S. Application Data

(63) Continuation of application No. 11/848,147, filed on Aug. 30, 2007.

(51) Int. Cl.
*G06F 15/16* (2006.01)
*H04L 29/08* (2006.01)
*H04L 12/28* (2006.01)

(52) U.S. Cl.
CPC ............ *H04L 67/16* (2013.01); *H04L 12/2809* (2013.01); *H04L 67/24* (2013.01)
USPC ............ 709/217; 709/201; 709/202; 709/203

(58) Field of Classification Search
USPC ......................................... 709/201–203, 217
See application file for complete search history.

(56) References Cited

U.S. PATENT DOCUMENTS

| | | | |
|---|---|---|---|
| 5,465,359 A * | 11/1995 | Allen et al. | 718/101 |
| 5,764,645 A * | 6/1998 | Bernet et al. | 370/395.52 |
| 5,862,335 A | 1/1999 | Welch, Jr. et al. | |
| 6,484,174 B1 | 11/2002 | Wall et al. | |
| 6,532,368 B1 * | 3/2003 | Hild et al. | 455/515 |
| 6,665,705 B1 | 12/2003 | Daniels-Barnes et al. | |
| 7,065,579 B2 * | 6/2006 | Traversat et al. | 709/230 |

(Continued)

FOREIGN PATENT DOCUMENTS

| | | |
|---|---|---|
| CN | 1645830 | 7/2005 |
| EP | 1320229 | 6/2003 |

(Continued)

OTHER PUBLICATIONS

Final Office Action mailed Mar. 17, 2010 in U.S. Appl. No. 11/848,147.

(Continued)

*Primary Examiner* — David Lazaro
*Assistant Examiner* — Sarah Drabik
(74) *Attorney, Agent, or Firm* — Fenwick & West LLP (57) ABSTRACT

In some embodiments, an apparatus includes device functional circuitry to perform at least one service; and network interface control circuitry to control interaction between the apparatus and a network. The network interface control circuitry includes a service discovery module to (1) send a presence announcement message to be transmitted outside the device to let other devices outside the device know of services the device may perform and (2) to receive presence announcement messages from the other devices outside the device to learn what services to the other devices may perform. In some embodiments, the network interface control circuitry includes a dynamic connection management module. Other embodiments are described and claimed.

18 Claims, 7 Drawing Sheets

(56) References Cited

U.S. PATENT DOCUMENTS

| | | | |
|---|---|---|---|
| 7,290,054 B2 | 10/2007 | Stoner et al. | |
| 7,444,409 B2 * | 10/2008 | Zou | 709/227 |
| 2002/0188714 A1 | 12/2002 | Bouthors | |
| 2003/0002521 A1 | 1/2003 | Traversat et al. | |
| 2003/0195934 A1 | 10/2003 | Peterson et al. | |
| 2004/0059722 A1 | 3/2004 | Yeh et al. | |
| 2004/0064511 A1 * | 4/2004 | Abdel-Aziz et al. | 709/206 |
| 2004/0088413 A1 * | 5/2004 | Bhogi et al. | 709/226 |
| 2004/0148334 A1 * | 7/2004 | Arellano et al. | 709/201 |
| 2005/0108389 A1 * | 5/2005 | Kempin et al. | 709/224 |
| 2006/0018264 A1 | 1/2006 | Yamakawa | |
| 2006/0064496 A1 | 3/2006 | Anderson et al. | |
| 2006/0107287 A1 | 5/2006 | Lee et al. | |
| 2006/0168243 A1 | 7/2006 | Zou | |
| 2006/0277275 A1 * | 12/2006 | Glaenzer | 709/219 |
| 2007/0081554 A1 | 4/2007 | Saffre | |
| 2007/0143449 A1 | 6/2007 | Wray West et al. | |
| 2008/0253383 A1 * | 10/2008 | Sehgal et al. | 370/401 |
| 2009/0234957 A1 * | 9/2009 | Li et al. | 709/229 |

FOREIGN PATENT DOCUMENTS

| | | | |
|---|---|---|---|
| EP | 1320229 A2 * | 6/2003 | H04L 12/58 |
| JP | 2000-224197 | 8/2000 | |
| JP | 2009-521191 | 5/2009 | |
| WO | WO 02/41642 A2 | 5/2002 | |
| WO | WO 2007/075968 A2 | 7/2007 | |

OTHER PUBLICATIONS

Final Office Action in U.S. Appl. No. 11/848,147 mailed Jan. 4, 2012.

Office Action in TW Patent Application No. 097126143 issued Dec. 22, 2011, 15 pages.

First Office Action mailed Jun. 19, 2012 (+ English translation), in Chinese Patent Application No. 200880105183.6, 12 pages.

Office Action mailed Jul. 5, 2012 (+ English translation), in Japanese Patent Application No. 2010-522990, 13 pages.

International Search Report and Written Opinion dated Apr. 29, 2009 in PCT/US2008/069364.

Non-Final Office Action in U.S. Appl. No. 11/848,147 mailed Aug. 5, 2009.

Office Action dated May 31, 2013 (+ English translation), in Chinese Patent Application No. 200880105183.6, 7 pages.

Official Action dated Feb. 7, 2013 (+ English translation), in Japanese Patent Application No. 2010-522990, 5 pages.

Chinese Third Office Action, Chinese Application No. 200880105183.6, Feb. 13, 2014, 10 pages.

Japanese Office Action, Japanese Application No. 2013-150733, May 20, 2014, 7 pages.

Korean Office Action, Korean Application No.10-2010-7004578, Apr. 21, 2014, 6 pages.

Korean Office Action, Korean Application No. 10-2010-7006865, May 27, 2014, 11 pages.

* cited by examiner

AUTOMATED SERVICE DISCOVERY AND DYNAMIC CONNECTION MANAGEMENT

FIELD

Embodiments relate generally to networks. Some embodiments relate more particularly to automatic service discovery and dynamic connection management in a service network.

BACKGROUND

A local area network (LAN) is a network in which a relatively small number of devices are networked together, such as in a house or small business. A LAN can connect to a wider network, including the Internet. A local service network is an interconnection network on which a variety of user-level services wish to advertise their presence and establish communication without the need for managed network services. Examples of network management services include: Dynamic Host Configuration Protocol (DHCP), which is used for assigning dynamic Internet Protocol (IP) addresses to devices on a network; Domain Name System (DNS) used for translating domain names to IP addresses; and Jini, which is software from Sun Microsystems to simplify a connection and sharing of devices on a network. A lightweight protocol is desired in order to enable services to be delivered in the form of low-cost, low-resource devices, such as a single-chip solution.

Zero Configuration Networking (ZeroConf) (Internet Engineering Task Force (ETF) Request for Comment (RFC) 3927) includes techniques to automatically create a usable IP network without configuration and special servers. Multicast DNS (mDNS) is a protocol used to identify which network items has a particular name. Devices on an mDNS based LAN store a list of DNS records. When an mDNS client wants to know the IP address of a device given its name, the device with the corresponding record replies with its IP address. DNS based Service Discovery (DNS-SD) is built on top of DNS. Multicast DNS and DNS-SD are attributed to Apple Inc. Microsoft Inc.'s Link-Local Multicast Name Resolution (LLNMR) is also used to identify which networked item has a particular name. A Media Access Control (MAC) address is a hardware address that uniquely identifies each node of a network. For example, in an Ethernet network, each device has a globally unique 48 bit global MAC address. Multicasting refers to sending a message to multiple (or all) devices on a network, including circumstances in which the message typically would not be intended for all the devices receiving the message. An Internet multicast refers to a similar activity using the Internet. Transmission Control Protocol (TCP or TCP/IP) and User Datagram Protocol (UDP or UDP/IP) are protocols that have been used in networks including the Internet.

Encryption is sometimes used in networks, and many different encryption formats and processes may be used in a network. Some prior art techniques are based on an active connection (for example, security sockets layer (SSL)) and append cryptographic state to a connection record.

Services may join and leave the network at will or unexpectedly, and so it is desirable for other services to quickly learn of new or unreachable services. In addition, services may be assigned different network addresses during active communication, and so a dynamic connection management technique is desired. In a low-resource setting, connection records are themselves scarce resources, and so it is useful to provide means of supporting more active connections than can be simultaneously open across the network. Further, encryption may be used in the communication between services, which adds additional complexity to the management of connections between services.

Although services may be intermittently active or attached to the network, they may maintain permanent state, for example, a set of preferences that name other services. Services may be active on a device whose network address changes, perhaps while actively attached to the network, for example, through IP address re-assignment. For these reasons, services use a globally unique and non-volatile identifier to distinguish the service when it is present on the network. A wide variety of techniques for assigning identifiers are possible. For example, a service identifier assignment authority could manage identifiers worldwide. Leveraging an existing globally unique identifier (for example, an Ethernet MAC address) and salting it with a local non-volatile sequence number represents another possibility.

SUMMARY

In some embodiments, a device includes device functional circuitry to perform at least one service; and network interface control circuitry to control interaction between the device and a network. The network interface control circuitry includes a service discovery module to (1) send a presence announcement message to be transmitted outside the device to let other devices outside the device know of services the device may perform and (2) to receive presence announcement messages from the other devices outside the device to learn what services the other devices may perform.

In some embodiments, the network interface control circuitry includes a dynamic connection management module.

Other embodiments are described and claimed.

BRIEF DESCRIPTION OF THE DRAWINGS

Embodiments of the inventions may be understood by referring to the following description and accompanying drawings that are used to illustrate embodiments. However, embodiments of the invention are not limited to the details of these drawings.

DETAILED DESCRIPTION

Figure 1:
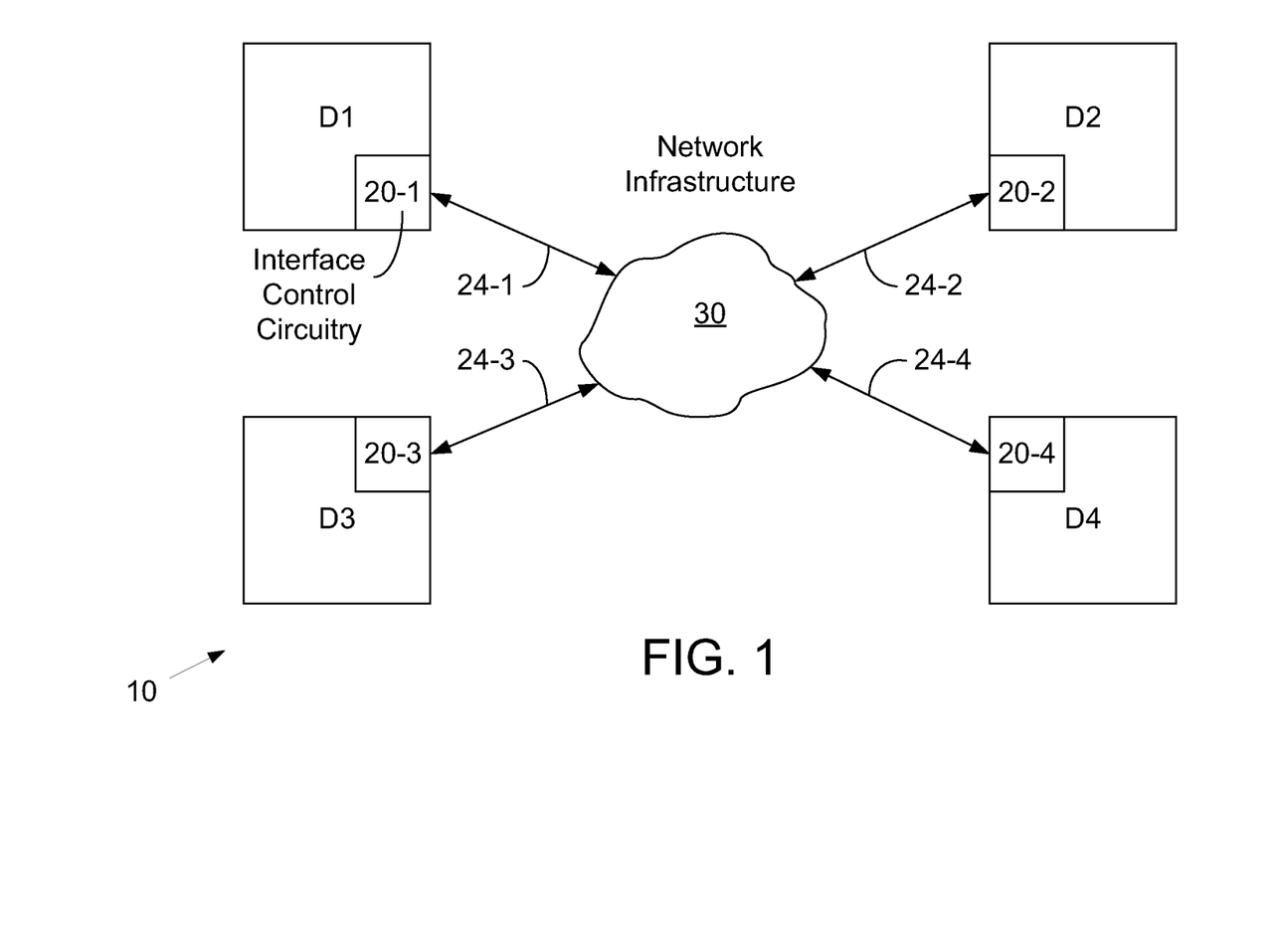
FIG. 1 is a block diagram representation of devices attached to a network according to some embodiments.

FIG. 1 illustrates a network 10 including devices D1, D2, D3, and D4 coupled to a network infrastructure 30 through conductors 24-1, 24-2, 24-3, and 24-4. As an example, network infrastructure 30 may be an Ethernet based network, but other types of networks may be used in replace of or in addition to an Ethernet based network. As long as they are connected to the network, devices D1-D4 are considered part of the network, but when physically or operationally removed, the devices are no longer part of the network. In practice, there may be more or less than four devices on the network. Device D1-D4 may perform a variety of services including providing video signals, displaying video, and printing. Devices D1, D2, D3, and D4 include network interface control circuitry 20-1, 20-2, 20-3, and 20-4, respectively. As an example, network 30 may be a home entertainment network that may include access to the Internet. Some or all of devices D1, D2, D3, and D4 may be entertainment devices such as televisions, DVD players, set top boxes, computers, video game systems, etc. Some of the devices may be more limited devices such as printers. System 30 can be a service network in that at least some of devices D1-D4 involve services and at least some of the devices wish to advertise their presence on the network and establish communication. Network interface control circuitry 20-1, 20-2, 20-3, and 20-4 may be identical for each device or one or more of the network interface control circuitry may be slightly different. For example, the network interface control circuitry for a printer may have less capability than network interface control circuitry for a television.

In some embodiments, devices may include one or more agents. In some circumstances, there may be a one-to-one relationship between agents and hardware resources the agents manage. For example, a single agent may manage a single broadcast tuner device and support a single active session. However, in some embodiments other resources may support multiple active sessions. For example, a video server may allow several active streams to be served from a single disk. In some embodiments, multiple agents provide identical service in providing access to the single media repository. These agents are equivalent in functionality and behavior, contend for the same resources, and have access to the same content, and such a collection of interchangeable agents may be termed an agent equivalence class.

Equivalence classes are useful for consolidating information concerning available resources and capabilities, thereby reducing storage and transmission requirements. Additionally, they enable remote agents to determine meaningful relationships between collections of agents. For example, if a video server is completely busy with active sessions, the equivalence class exposes the set of agents that could be contacted to free resources in order to enable a new session to be started.

In some embodiments, an agent may be identified by the assignment of a unique identifier. In one example, a 64-bit numerical identifier may be assigned to each agent. The agent identifiers are persistent and globally unique for each agent. In this example, the value zero is reserved and indicates an invalid or unspecified agent identity, and the value of all ones (hex 0xFFFFFFFFFFFFFFFF) is reserved as a wildcard to indicate all agents. The format of the agent identifier is depicted in Table 1.

TABLE 1

Format of an Agent Identifier.

| Byte | 0 | 1 | 2 | 3 | 4 | 5 | 6 | 7 |
|---|---|---|---|---|---|---|---|---|
| Type | Instance | Group | | Globally Unique Value | | | | |

In this example, the six-byte Globally Unique Value field is unique across all devices. The manner in which this value is selected may be left unspecified, but in one example the value may be the 48-bit Ethernet MAC address of the network interface, which are assigned by a central authority and thus are globally unique. In an embodiment, the value chosen may be required to interoperate with the Ethernet MAC address scheme, and thus not produce a valid MAC address. The Instance and Group fields of the agent identifier may, for example, be assigned locally by the designer of a device. Together, the group field and the unique value field identify an agent equivalence class. In an example, the group field may be interpreted as an unsigned integer value, which enables a device to create up to 256 equivalence classes. The instance field may be interpreted as an unsigned integer. The instance field identifies a particular agent within an equivalence class. Instance values for a given equivalence class must occupy a consecutive range. Thus, a single device may support up to 65536 agents in groups of 256.

Figure 2:
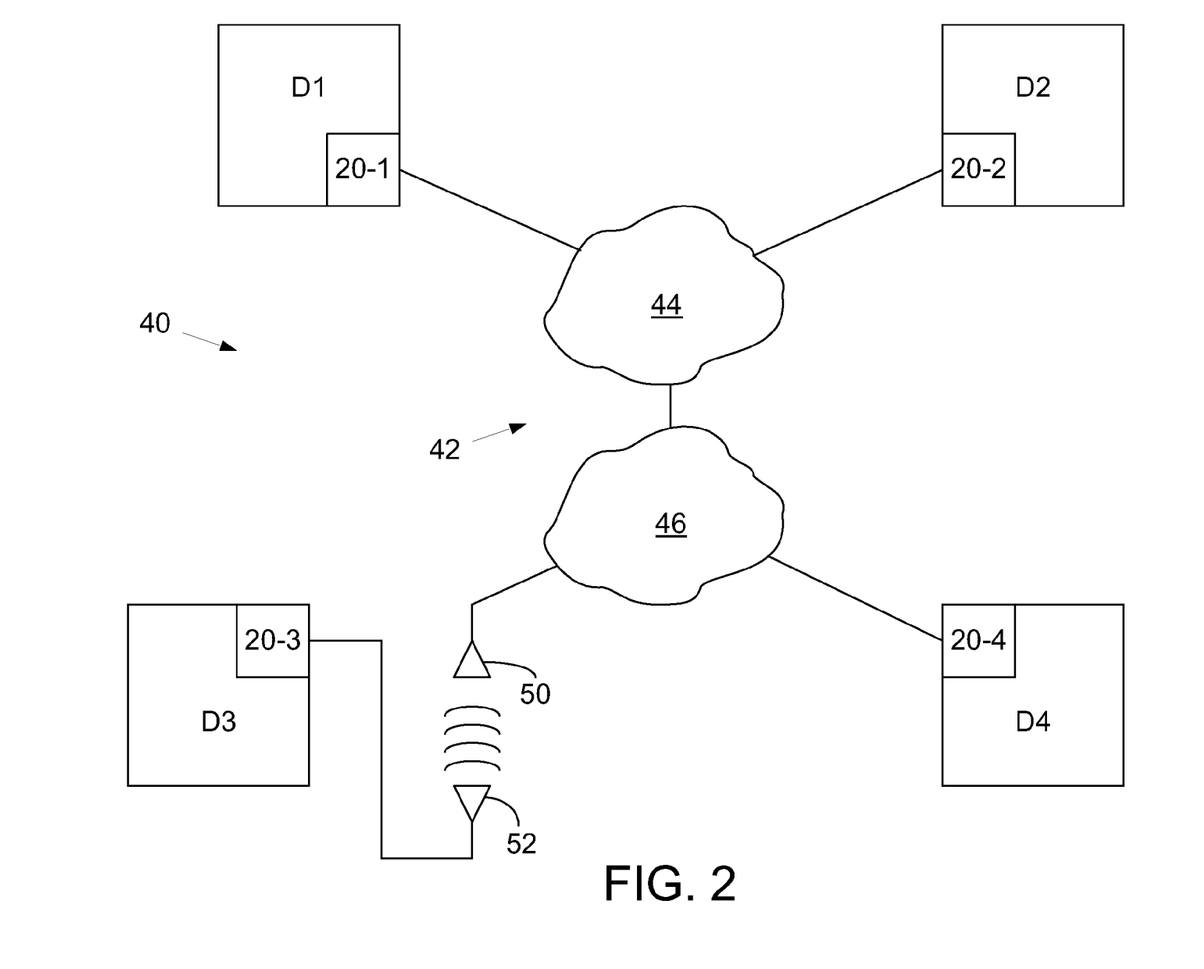
FIG. 2 is a block diagram representation of devices attached to a network according to some embodiments.

FIG. 2 is similar to FIG. 1, except that in FIG. 2, a network 40 includes a network infrastructure 42 that is made up of two sub-network infrastructures 44 and 46. Further, device D3 is coupled to sub-network infrastructure 46 through a wireless connection including access points/antennas 50 and 52. FIG. 2 provides one example of a network having four devices attached, but embodiments are not limited to any particular number of elements. There may be more or less than four devices coupled to network 42.

Figure 3:
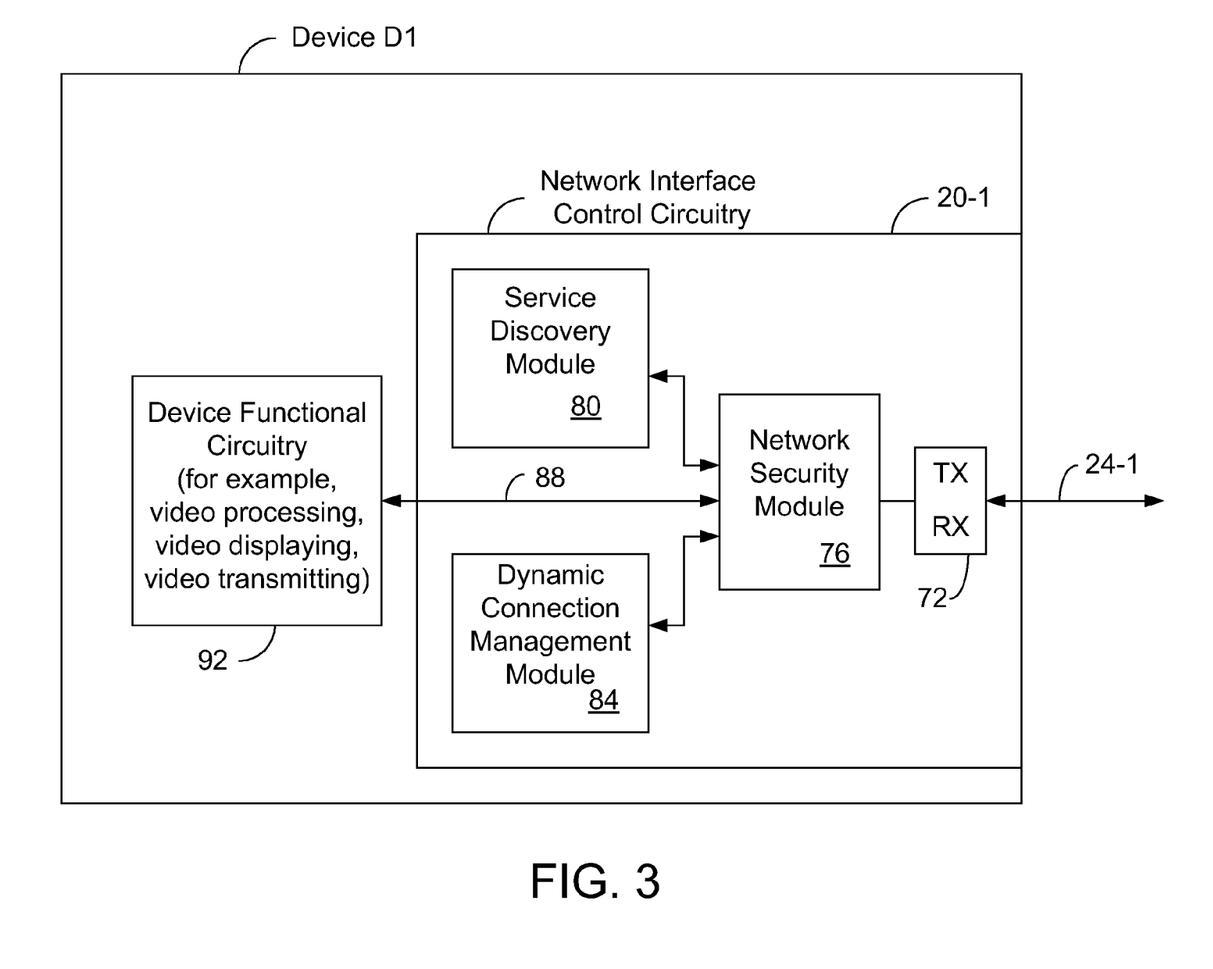
FIG. 3 is a block diagram representation of details of a network device according to some embodiments.

FIG. 3 illustrates network interface control circuitry 20-1 according to some embodiments. In other embodiments, the network interface control circuitry may vary. Further, as noted above, the network interface control circuitry may vary depending on, among other factors, the device it is used with. Transmitters and receivers 72 are coupled between conductors 24-1 and a network security module 76. Conductors 24-1 may be a single set of conductors on which signals are conducted bi-directionally. Alternatively, conductors 24-1 may comprise multiple sets of conductors in which signals are passed in different directions. The various signals on the conductors may be multiplexed, packetized, or otherwise carried on the conductors. Various types of signaling may be used.

Network security module 76 is intended to ensure that communications from conductors 24-1 are allowed to pass to other portions of device D1. In some embodiments, network security module 76 will only pass signals from devices that have been authenticated. For example, in some embodiments or situations, security module 76 will only pass signals that have a particular token or key in a header. Further, in some embodiments, network security module 76 or some other module in device D1 makes sure signals from device D1 have proper identifiers (such as in a header) so they are accepted by other devices. Other security functions are described below. In some embodiments, network security module 76 is not included or has reduced capability as compared to what is described herein. Service discovery module 80 performs automatic service discovery, described below. Dynamic connection management module 84 performs dynamic connection management, described below.

Figure 4:
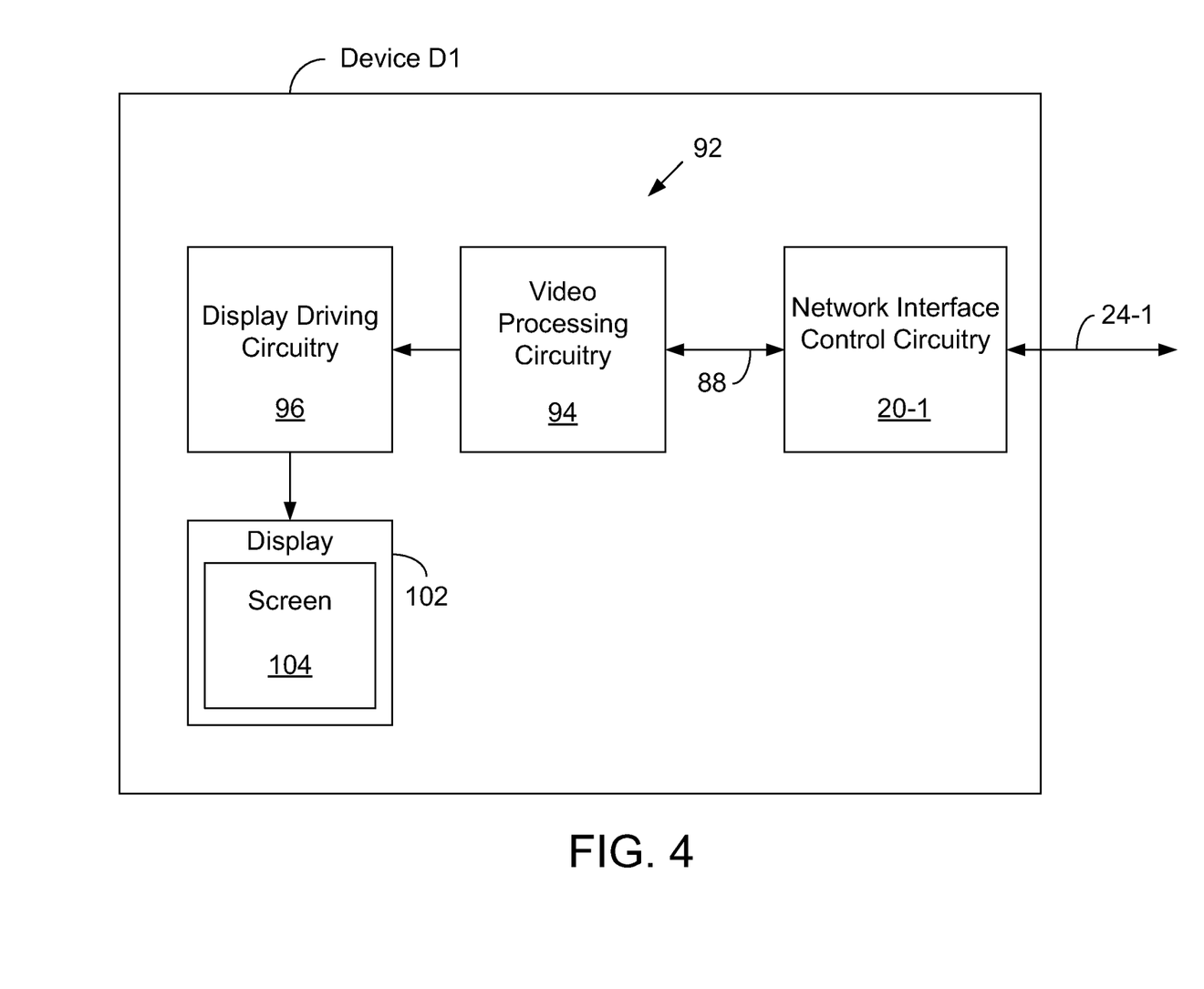
FIG. 4 is a block diagram representation of details of a network device according to some embodiments.
Figure 5:
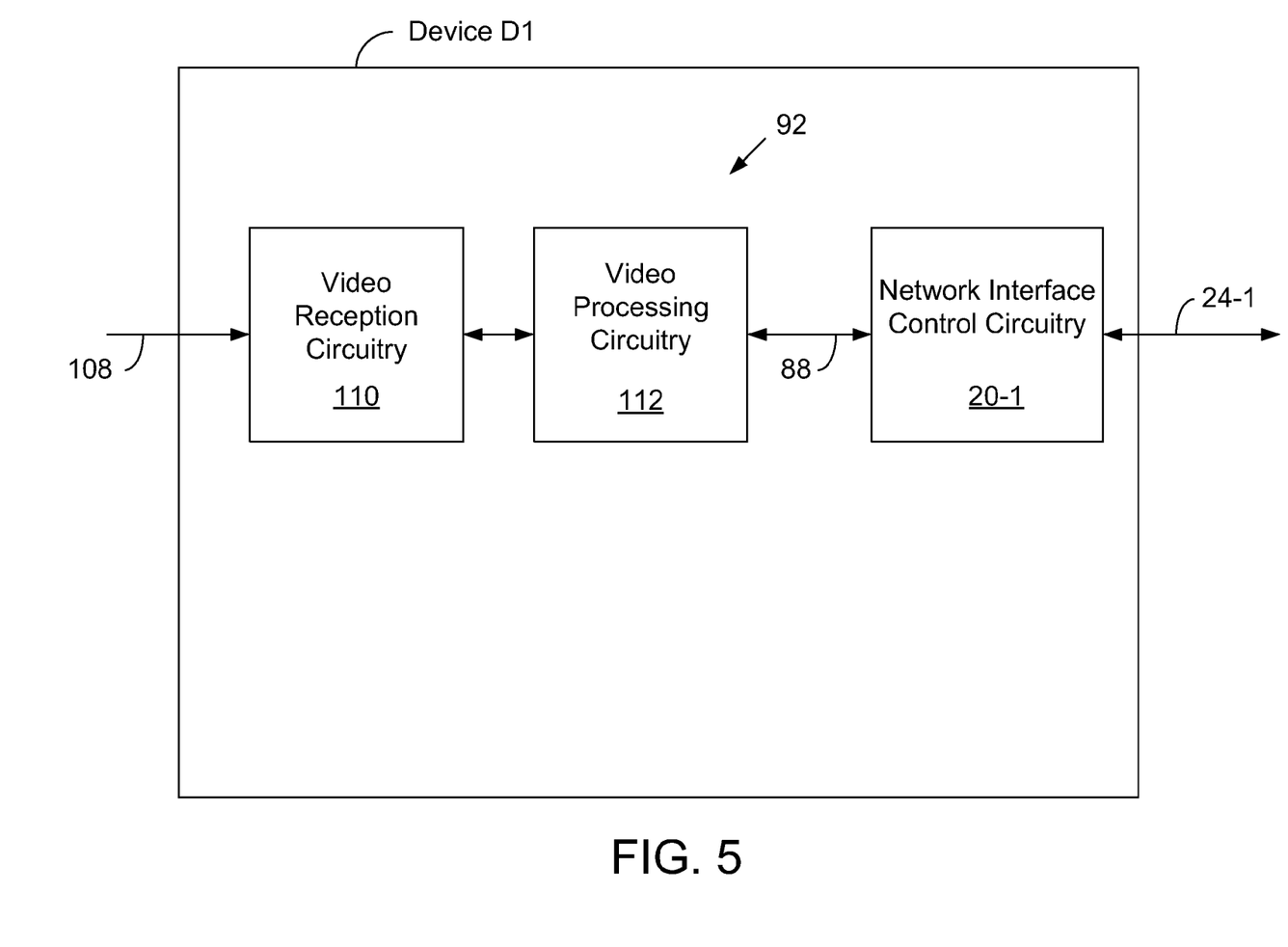
FIG. 5 is a block diagram representation of details of a network device according to some embodiments.

Conductors 88 carry signals to other components referred to as device functional circuitry 92 of device D1. The services provided by a device include the services performable by the device functional circuitry 92. The device functional circuitry is different in different devices. Examples of the device functional circuitry 92 include video processing, video displaying, video transmitting, and various other functions. FIG. 4 shows details of a device D1 that may be characterized as a television in which the device functional circuitry 92 includes video processing circuitry 94, display driving circuitry 96, and a display 102 including a screen 104. FIG. 5 shows details of a device D1 that may be characterized as a set top box in which the device functional circuitry 92 includes video reception circuitry 110 that receives video signals (as well as audio and control signals) from, for example, a cable outlet or satellite receiver through conductors 108. Video reception circuitry 110 provides video signals (and perhaps also audio and control signals) to video processing circuitry 112, which provides video signals to network interface control circuitry 20-1. Video reception circuitry 110 may include some form of network interface control circuitry, but such circuitry is not required in embodiments.

Figure 6:
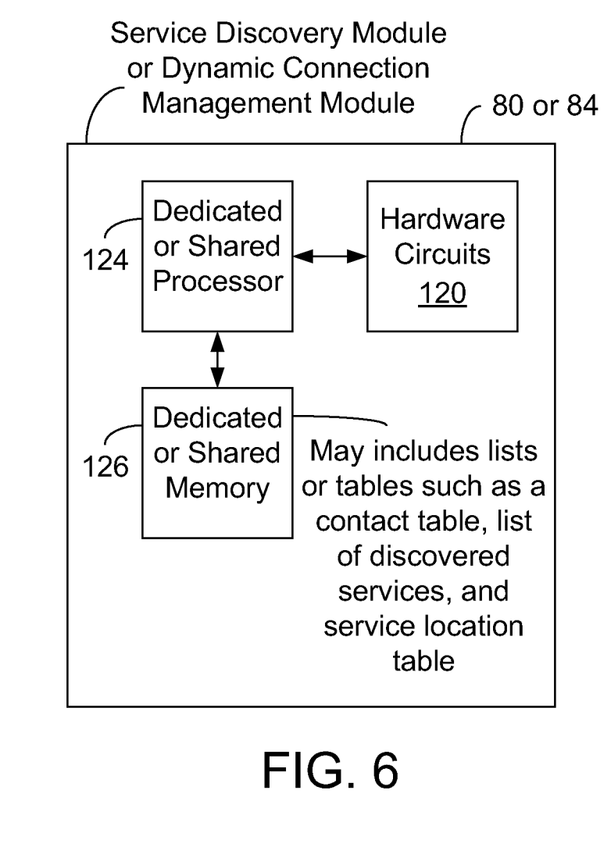
FIG. 6 is a block diagram representation of details of a service discovery module and a dynamic connection management module according to some embodiments.

FIG. 6 illustrates either service discovery module 80 or dynamic connection management module 84 according to some embodiments. Referring to FIG. 6, a dedicated or shared processor 124 operates on instructions received from dedicated or shared memory 126, and uses dedicated or shared memory 126 for storing data. In this context, dedicated or shared means the processor or memory may be dedicated just to the particular module or the module may share the processor or memory with other components. Dedicated or shared memory 126 may keep instructions and data separate or together. Dedicated or shared memory 126 may include lists or tables such as a contact table, a list of discovered services, and a service location table. Hardware circuits 120 interface with dedicated or shared processor 124 and perhaps with other components in or outside the module.

Figure 7:
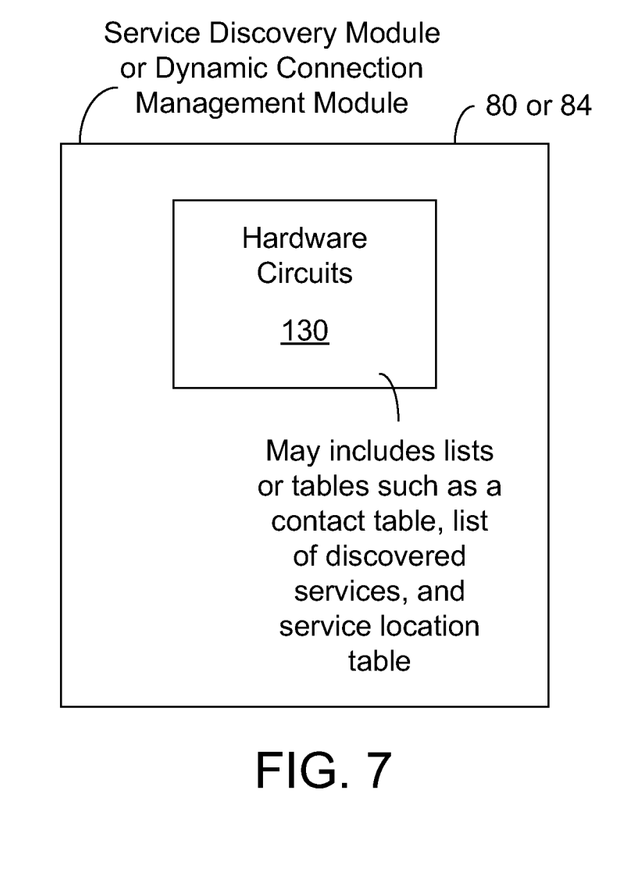
FIG. 7 is a block diagram representation of details of a service discovery module and a dynamic connection management module according to some embodiments.
Figure 8:
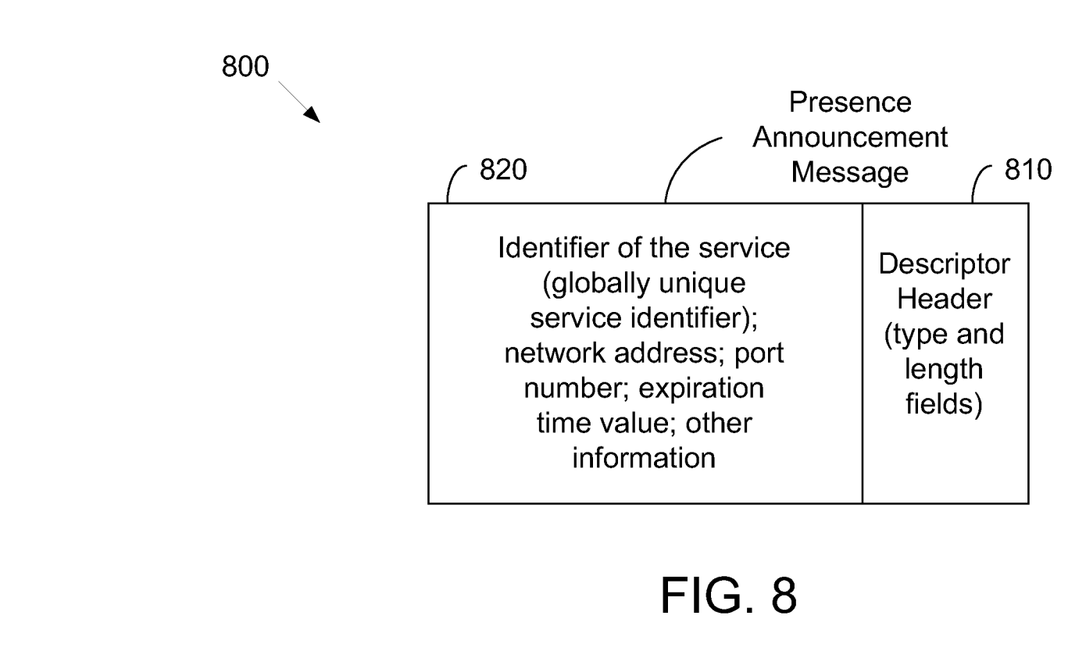
FIG. 8 is a representation of a presence announcement message according to some embodiments.

FIG. 7 illustrates either service discovery module 80 or dynamic connection management module 84 according to some embodiments. Referring to FIG. 6, hardware circuits 130 performs the functions of the module. Hardware circuits 130 may include lists or tables such as a contact table, a list of discovered services, and a service location table. FIG. 8 represents a presence announcement message according to some embodiments. Other embodiments include a somewhat different presence announcement message or the same function performed quite differently. Referring to FIG. 8, a descriptor header 810 of a message 800 includes type and length fields. The body 820 of the message may include a variety of information including an identifier for the service (which may be a globally unique service identifier), a network address, a port number, expiration time value, and other information. This is described in greater detail below.

Automatic Service Discovery

The following describes details of automatic service discovery according to some embodiments. Other embodiments include different details. Service discovery involves a device learning what services are available on the network. From the perspective of a particular device, a service of another device may join or leave the network at any time. When a service network is defined to be a local area network, broadcast communication is possible. When the service network is routed, Internet multicast can be used. Leveraging these communication techniques, messages can be transmitted to all potential services attached to the network without knowing their addresses. Such a mechanism is most useful in the local area when the number of services relative to the network bisection bandwidth is low.

In this environment, a simple system becomes possible. In some embodiments, services are responsible for periodically announcing their presence. In some embodiments, periodically means at substantially but not necessarily exactly regular intervals, and in other embodiments, periodically means at exactly regular intervals. The length of the intervals may vary and may change over time. In some embodiments, such a presence announcement message includes at least the following information: the identifier of the service, the network address and port number at which the service can currently be contacted, and a expiration time (ET) value to indicate how long this announcement message is considered valid. In other embodiments, some of this information might not be included and additional information may be included. Services that receive such announcement messages can construct a contact table for the services that are currently available. If a receiver (such as a service discovery module) of the device does not receive another announcement message from a given service before some multiple of its ET expires, that service can be considered to have departed the network.

By tuning the ET value, a service can control the frequency of its announcements. The ET can be set by the device that performs the service, or by another device. Greater frequency (a shorter ET value) improves robustness and detection latency. This helps with dealing with the loss of announcement messages, as well as enabling faster detection that services that have become detached from the network (for example, due to cable removal). The receiver can also adjust or tune its sensitivity to the ET expiration. The longer it waits beyond the ET expiration, the less quickly it is able to determine that a service has become detached from the network. If the wait beyond ET expiration is too short, a receiver may determine that a service is unavailable when in fact, for example, its announcement message was dropped by the network. In some embodiments, each service can adjust or tune these parameters based on the environment and application domain.

In some embodiments, a service discovery module sends out its own presence announcement message to other devices on the network and also receives presence announcement messages from other devices on the network. In different embodiments the presence announcement message may, for example, be provided by the service discovery module or may be transmitted by the transmitters, and it may be received by the transmitters or may be provided to the service discovery module. In various embodiments, the service announcement may be packetized or may not be packetized.

Sometimes it is desirable to get an immediate notice from all active services. For example, a device may wish to display a list of available printers on the network and wants to ensure that its list of available services is as up-to-date as possible. In some embodiments, a presence request message can be sent. When a service receives a presence request message, it immediately responds by transmitting an announcement message. The announcement response could be, for example, unicast to the requester or multicast to all potential services.

In some embodiments, this system differs from conventional multicast DNS/DNS-SD and LLMNR in several respects. The announcements may serve the dual purpose of specifying the service location and acting as a keep-alive notice. The conventional approaches may involve two levels of name resolution to discover the location of a service. The first level matches the name of a service with the network name of the device on which it is located. The second level matches the device name to the network address. This adds unnecessary complexity that may not be practical for low-resource environments. Further, in conventional approaches additional information cannot be easily conveyed as part of the discovery process.

Enhanced Service Announcement

The following describes details of an enhanced service announcement according to some embodiments. Other embodiments include different details. The basic service announcement message described above provides a minimum mechanism for discovering services and detecting when such services are active. To discover further information about the capabilities and status of the service, the service is contacted and queried, which is an approach adopted by conventional mechanisms. However, in some embodiments the announcement scheme enables a service to include commonly requested information in the announcement itself.

In some embodiments, a descriptor to identify the type or class of service can be included in the announcement. This enables receivers to be more selective in what information they retain about remote services. For example, a video display service may wish to maintain a list of video source services. Without the type field in the announcement message, the video display service may have to cache all service locations or contact each in turn to determine the service class. In some embodiments with the service type field included, the video display service may maintain a list of only the video source services and contact only those services, saving resources and time.

In some embodiments, the format and interpretation of a service type field is well-known and may be a standard part of the announcement protocol. Otherwise, remote services might not be able to utilize the type field. However, for each type of service, the remainder of the announcement message can be defined in a service-specific fashion—that is, only services interested in a particular service are required to understand any additional information conveyed in the announcement.

Services may wish to include other commonly useful information in announcements, as deemed meaningful by the service type. For example, services may include general information, such as the running time, an indication that an interesting event has occurred (for example, via a timestamp or generation count and an event designator), busy/available status, the number of items managed by the service (for example, number of songs in a music service), etc. Service-specific information is also possible. For example, a digital media repository may include the amount of free space available, the number of streams the repository can support, the number of active streams, the list of capabilities the repository supports (for example, recording, trick play), etc. A wide array of possible attributes may be included, but a protocol designer may balance when to include information in all announcements (at the cost of increased bandwidth usage) and when to require a query for the information (at the cost of increased latency).

An embodiment for a personal entertainment network (for example, a network for carrying digital media content within a home) could include top-level service types: media source, media sink. A media source or sink could include an attribute to designate the type of content it supports: movies (combined audio/video), music (audio only), photos (images), user interface and control, 2D graphics, 3D graphics, etc. A media source may include an additional attribute to indicate whether the media source supports time shifting, while a media sink may include an attribute to indicate whether the media sink supports storage (recording) or display. Dynamic state may also be included to indicate whether the service is busy or free and the amount of used and free space for a storage service.

Dynamic Connection Management Module

The following describes details of dynamic connection management according to some embodiments. Other embodiments include different details. Within the service discovery system outlined above, services can determine the network address at which to contact a remote service. This address can change dynamically, and the remote service can spontaneously detach from the network. Multiple services may be hosted on a single device, which potentially may burden each service with maintaining connection state and perhaps exchanging information with other local services in order to manage a single connection record, thereby adding more complexity than is often practical. Therefore, in some embodiments a shared connection management system may be employed.

By addressing a message using a globally unique service identifier, a dynamic connection management module can be centralized within a device, and the module can manage fewer connection records than there are active communication sessions. For example, a service may be simultaneously communicating with several remote services while the connection management module utilizes a single connection record. In a low-resource environment, such dynamic connection management allows for conserving resources and enabling lower cost solutions.

In some embodiments, a dynamic connection management module may operate as follows: Services register interest in classes of remote services with the connection management module, which then maintains a cache of discovered service locations that match the registered criteria. Services can query the dynamic connection management module to iterate over the list of discovered services. When a service has a message the service wishes to send to a remote service, it passes the message data, message length, and service identifier to the connection management module. The connection management module searches for the service identifier in its list of discovered services—that is, those for which the connection management module has received announcement messages and recorded the network address. The connection management module checks to see if it has an open connection to the remote service. If not, the connection management module opens a connection and delivers the message. In this process, the network address of the remote service can change at any time. In some embodiments, if there is no free connection record available, the least recently used connection record can be reclaimed by closing the connection first. In some embodiments, other policies may also be implemented to address the availability of connection records, including the use of priorities.

A receiver of another device may follow the same flow in reverse, using the service location table to determine the destination service for an incoming message.

A connection to a remote service could be over an unreliable protocol (for example, UDP), but this adds burden to each service to implement a reliability scheme. Instead, the dynamic connection management module can handle the reliability requirement by either wrapping the service messages to provide reliability (for example, adding sequence numbers and re-transmissions on top of UDP) or by using a reliable protocol (such as TCP) for transmission. The state for such reliable connections can be quite large, hence the desire to allow more connections than connection records. There is added latency each time a connection must be opened, but in some embodiments a design may support a number of connection records that minimizes thrashing the connection records.

In this way, a low-resource device can maintain active communication between a larger set of services than the number of connection records the device can maintain. For example, on the order of sixteen bytes are required to record the location of a service, but 512 bytes may be needed for a connection record.

Supporting Encryption

The following describes details of supporting encryption according to some embodiments. Other embodiments include different details. In order to safeguard communication between services, it is often desirable to encrypt the message content. Contemporary schemes are based on an active connection (for example, SSL) and append cryptographic state to the connection record. In some embodiments, in order to use fewer connection records than active communication paths and reduce authentication latency, the cryptographic state is stored outside of the connection record. This state includes the current session key. If counter mode encryption with a block cipher is used, only the current counter value is also required, and each block of data can be encrypted independently.

Encryption support can be implemented in the following manner. When a service wishes to send a message to a remote service, the service passes the message data, message length, remote service identifier, and cryptography flag to the dynamic connection management module. When the dynamic connection management module is requested to deliver a message, it will open a new connection as above, if necessary. In certain instances, it may be necessary to close an existing connection in order to open the new connection. If there is no active cryptography session, an authentication exchange is made with the remote endpoint in order to generate a session key. The message data is encrypted with the key and delivered to the remote endpoint. If the connection is closed and re-opened, the session key can be re-used (provided it meets the requirements of the cryptography algorithm with respect to susceptibility to attack).

The above approach may be considered inadequate protection, since the key may be used for an extended period of time. The key may be "rolled", meaning that a new key is generated by salting it with a counter value derived from the stream. If the sender and receiver remain synchronized, the number of bytes transmitted can serve as the counter. However, when the connection is transient, this synchronization requirement may not be met. To enable the rolling of keys, the following system is adopted.

In some embodiments, a secure connection can be viewed as a reliable byte stream or a reliable message stream. A simple wrapper protocol is introduced. This protocol includes a header with type and length fields, indicating that length bytes of data of class type follow. Message types include authentication, key roll, application data, and perhaps combinations of two or more types in a single message. This adds little overhead (for example, using an 8-bit type and a 24-bit count), while enabling the dynamic connection management module to interpose security-related messages within the service message stream.

Using this wrapper protocol, when opening a connection for the first time, the dynamic connection management module would exchange authentication messages as before, pre-pending a header with the appropriate type field. Next, it would send a key message to indicate the counter value with which to salt the key. The cipher engine is then loaded with the new key, so that all subsequent messages are encrypted with the new key. Then, the service messages can be encrypted and delivered, pre-pending with the appropriate header to indicate application data. If the connection is closed and re-opened, the dynamic connection management module can forego the authentication step (if it does not introduce cryptographic weakness) and commence communication by first delivering a key roll message. Then, communication then may continue as before.

In this way, the local services can communicate securely while dynamically managing fewer connection records than active communication sessions and limiting the frequency of performing secure authentication.

Additional Information and Embodiments

The various modules described herein may be provided in hardware, software, firmware, or in any combination of hardware, software, and firmware.

There may be intermediate structure between the illustrated components. The various components described or illustrated herein may have additional inputs or outputs which are not illustrated or described. In actual implementations of the systems of the figures, there would be additional circuitry, control lines, and perhaps interconnects which are not illustrated. When the figures show two blocks connected through conductors, there may be intermediate circuitry that is not illustrated. The conductors mentioned herein do not have to be of continuous material. For example, they may include vias or other connection structures. The shape and relative sizes of the blocks is not intended to relate to actual shapes and relative sizes. The fact that an arrow between blocks is shown in only one direction does not mean that there is not communication in the other direction. A single line between blocks does not mean there are not other conductors between the blocks.

An embodiment is an implementation or example of the invention. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments.

When it is said that element "A" is coupled to element "B," element A may be directly coupled to element B or be indirectly coupled through, for example, element C. When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." Likewise, when it is said that A is in response to B, A may be in response to the combination of B and C.

If the specification states a component, feature, structure, process, or characteristic "may", "might", or "could" be included, that particular component, feature, structure, process, or characteristic is not required to be included. If the specification or claim refers to "a" or "an" element, that does not mean there is only one of the element.

The invention is not restricted to the particular details described herein. Indeed, many other variations of the foregoing description and drawings may be made within the scope of the present invention. Accordingly, it is the following claims, including any amendments thereto, and not the above description, that define the scope of the invention.

What is claimed is:

1. A device comprising:
 device functional circuitry to perform one or more services;
 network interface control circuitry to control interaction between the device and a network, wherein the network interface control circuitry includes:
 a service discovery module to:
 send presence announcement messages to be transmitted outside the device to periodically inform other devices outside the device regarding services the device may perform; and receive presence announcement messages from the other devices outside the device to learn what services the other devices may perform, a dynamic connection management module to perform dynamic connection management including managing connections of the device with other devices outside the device; and a contract table maintained by the device to indicate remote services that are currently available from the other devices, the availability of remote services from the other devices being determined by the device based solely on received presence announcement messages, wherein the device is to determine that a first remote service of another device has left the network if a second presence announcement message for the first remote service has not arrived within a certain time period after arrival of a first presence announcement message for the first remote service, the time period being based on a first expiration time value for the first presence announcement contained in the first presence announcement message and on factors regarding transmitted and received presence announcement messages;

wherein the service discovery module is to set the factors regarding transmitted and received presence announcement messages, the factors including:

an announcement expiration time value for sent presence announcement messages for services of the device to control frequency of presence announcement messages the service discovery module sends; and a sensitivity to expiration of received presence announcement messages, the sensitivity being a predetermined additional length of time after expiration of a received presence announcement message, wherein a remote service described in the received presence announcement message is determined to be unavailable upon the passage of the additional length of time after expiration of the received presence announcement message;

wherein each presence announcement message includes an identifier of a service included in the presence announcement message, a descriptor to identify a type or class of the service included in the presence announcement message, and an expiration time value to indicate how long the presence announcement message is valid;

wherein each service of the device may register interest in one or more classes of remote services with the dynamic connection management module, the dynamic connection management module maintaining a cache of discovered service locations that match the registered interests of the services of the device in the one or more classes of remote services, and wherein a respective service of the device is configured to send a message to a remote service by providing a request to the dynamic connection management module, the request including message data, a message length, a service identifier, and a cryptography flag.

2. The device of claim 1, further comprising one or more agents, each given agent of the one or more agents being configured to manage a corresponding hardware resource and to provide a corresponding service.

3. The device of claim 2, wherein each given agent of the device has a unique identifier that associates the given agent with an equivalence class, the equivalence class defining a relationship between the given agent and one or more remote agents that provide the remote services.

4. The device of claim 1, wherein the device is configured to send a presence request message to request a notice from the other devices regarding available services provided by the other devices.

5. The device of claim 1, wherein the network interface control circuitry further includes:

a network security module to disallow unauthorized signals past the network interface control circuitry, the network security module being coupled between the service discovery module and a transmitter or receiver and between the dynamic connection management module and the transmitter or receiver.

6. The device of claim 1, wherein:

the respective service is configured to simultaneously communicate with a plurality of remote services via a single connection record.

7. The device of claim 1, wherein the services of the device can query the dynamic connection management module to iterate over the cache of discovered services.

8. The device of claim 1, wherein:

upon receiving the request from the respective service of the device to send a message to the remote service, the dynamic connection management module searches for the service identifier included in the request in the cache of discovered service locations to determine if the dynamic connection management module has an open connection to the remote service; and if no open connection exists, the dynamic connection management module opens a connection to the remote service.

9. The device of claim 1, wherein the dynamic connection management module provides a reliability requirement by wrapping service messages to provide reliability.

10. The device of claim 1, wherein managing connections of the device with other devices outside the device includes, if there is no connection record available, reclaiming a least recently used connection record by closing a respective connection.

11. A system comprising:

a network infrastructure;

a plurality of devices;

wherein each device of the plurality of devices includes:

device functional circuitry to perform one or more services;

network interface control circuitry to control interaction between the device and a network, wherein the network interface control circuitry of the device includes:

a service discovery module to:

send presence announcement messages to be transmitted outside the device to periodically inform other devices outside the device regarding services the device may perform; and receive presence announcement messages from the other devices outside the device to learn what services the other devices may perform, a dynamic connection management module to perform dynamic connection management for the device including managing connections of the device with other devices outside the device, and a contract table maintained by the device to indicate remote services that are currently available from the other devices, the availability of remote services from the other devices being determined by the device based solely on received presence announcement messages, wherein the device is to determine that a first remote service of another device has left the network if a second presence announcement message for the first remote service has not arrived within a certain time period after arrival of a first presence announcement message for the first remote service, the time period being based on a first expiration time value for the presence announcement message contained in the first presence announcement message and factors regarding transmitted and received presence announcement messages;

wherein the service discovery module for each device is to set the factors regarding transmitted and received presence announcement messages, the factors including:

an announcement expiration time value for sent presence announcement messages for services of the device to control the frequency of presence announcement messages the service discovery module sends; and a sensitivity to expiration of received presence announcement messages, the sensitivity being a predetermined additional length of time after expiration of a received presence announcement message, wherein a remote service described in the received presence announcement message is determined to be unavailable upon the passage of the additional length of time after expiration of the received presence announcement message;

wherein each presence announcement message includes an identifier of a service included in the presence announcement message, a descriptor to identify a type or class of the service included in the presence announcement message, and an expiration time value to indicate how long the presence announcement message is valid;

wherein each service of a given device of the plurality of devices may register interest in one or more classes of remote services with the dynamic connection management module, the dynamic connection management module maintaining a cache of discovered service locations that match the registered interests of the services of the given device in the one or more classes of remote services, and wherein a respective service of the given device is configured to send a message to a remote service by providing a request to the dynamic connection management module, the request including message data, a message length, a service identifier, and a cryptography flag.

12. The system of claim 11, wherein the respective service of the given device is configured to simultaneously communicate with a plurality of remote services via a single connection record.

13. The system of claim 12, wherein multiple services are hosted on a single device of the plurality of devices.

14. The system of claim 11, wherein the network is a local area network and broadcast communication is used for the network.

15. The system of claim 11, wherein the network includes routing of messages and Internet multicast.

16. The system of claim 12, wherein encryption is used in the system, and wherein a cryptographic state is stored outside of a connection record maintained by the dynamic connection management module of the device.

17. The system of claim 16, wherein:

responsive to receiving the request from the respective service, the dynamic connection management module opens a new connection to enable the respective service to send the message to the remote service.

18. The system of claim 11, wherein managing connections of the device with other devices outside the device includes, if there is no connection record available, reclaiming a least recently used connection record by closing a respective connection.

* * * * *